(12) United States Patent
Kang et al.

(10) Patent No.: US 8,669,015 B2
(45) Date of Patent: Mar. 11, 2014

(54) SOLID-STATE FUEL CELL INCLUDING ANODE AND CATHODE CHEMICAL ELECTROLYTE PROTECTION LAYERS AND A HYDROGEN ION CONDUCTIVE SOLID OXIDE DENSE FILM

(75) Inventors: SangKyun Kang, Seoul (KR); Joonhyung Shim, Mountain View, CA (US); Friedrich B. Prinz, Woodside, CA (US); Turgut M. Gür, Palo Alto, CA (US)

(73) Assignees: Samsung Electronics Co., Ltd., Suwon-si, Gyeonggi-do (KR); The Board of Trustees of The Leland Stanford Junior University, Palo Alto, CA (US)

( * ) Notice: Subject to any disclaimer, the term of this patent is extended or adjusted under 35 U.S.C. 154(b) by 798 days.

(21) Appl. No.: 12/417,095

(22) Filed: Apr. 2, 2009

(65) Prior Publication Data

US 2010/0255406 A1 Oct. 7, 2010

(51) Int. Cl.
*H01M 8/04* (2006.01)

(52) U.S. Cl.
USPC ........... 429/433; 429/487; 429/488; 429/489; 429/496

(58) Field of Classification Search
USPC .................. 429/487, 488, 489, 496, 433
See application file for complete search history.

(56) References Cited

U.S. PATENT DOCUMENTS

| | | | |
|---|---|---|---|
| 5,795,669 A | 8/1998 | Wilkinson et al. | |
| 6,558,831 B1 | 5/2003 | Doshi et al. | |
| 6,740,441 B2 | 5/2004 | Jacobson et al. | |
| 2006/0251950 A1* | 11/2006 | Prinz et al. | 429/40 |

FOREIGN PATENT DOCUMENTS

| | | |
|---|---|---|
| JP | 11-162483 | 6/1999 |
| JP | 2005-513721 | 5/2005 |
| JP | 2006-331720 | 12/2006 |

OTHER PUBLICATIONS

Kreuer K.D. *Proton-Conducting Oxides*. Annu. Rev. Mater. Res. 2003. 33:333-59.
Uda, Tetsuya et al. *Thermodynamic Analysis and Conductivity of Yttrium Doped Barium Zirconate*. Materials Science, California Institute of Technology, Pasadena California.
Korean Office Action dated Oct. 28, 2010, issued in corresponding Korean Patent Application No. 10-2009-0030511.

* cited by examiner

*Primary Examiner* — Kimberly Rizkallah
*Assistant Examiner* — Caleb Henry
(74) *Attorney, Agent, or Firm* — Stein IP, LLC

(57) ABSTRACT

A solid-state fuel cell includes: an anode; an anode side chemical electrolyte protection layer disposed on the anode; a hydrogen ion conductive solid oxide film disposed on the anode side chemical electrolyte protection layer; a cathode side chemical electrolyte protection layer disposed on the hydrogen ion conductive solid oxide film; and a cathode disposed on the cathode side chemical electrolyte protection layer.

18 Claims, 10 Drawing Sheets

SOLID-STATE FUEL CELL INCLUDING ANODE AND CATHODE CHEMICAL ELECTROLYTE PROTECTION LAYERS AND A HYDROGEN ION CONDUCTIVE SOLID OXIDE DENSE FILM

STATEMENT OF GOVERNMENT SUPPORT

This invention was made with Government support under contract N00014-07-10758 awarded by the Office of Naval Research. The Government has certain rights in this invention.

BACKGROUND

1. Field

One or more embodiments relate to a solid-state fuel cell and a method of manufacturing the same, and more particularly, to a solid-state fuel cell including a chemical electrolyte protection layer and a method of manufacturing the same.

2. Description of the Related Art

It is desirable for a fuel cell to secure high energy conversion efficiency and price competency. In order to support anode and cathode reactions, catalysts are respectively included in the anode and the cathode of the fuel cell. In such fuel cells, if the temperature is increased, more electrochemical reaction may occur, even if the amount of catalysts remains the same. Thus, a lesser amount of catalyst is needed for a fuel cell that operates at a higher temperature, thereby improving price competency. On the other hand, in a polymer electrolyte fuel cell, an electrolyte membrane should be hydrated to obtain ionic conductivity. Accordingly, in order to avoid dehydration of the electrolyte membrane, the polymer electrolyte fuel cell should be operated at a temperature of 80° C. or less at the pressure of 1 atmospheric pressure. Thus, a relatively large amount of precious metal catalysts such as platinum may be used in a polymer electrolyte fuel cell.

In a high temperature fuel cell such as a solid oxide fuel cell (SOFC), the operating temperature is relatively high, about 800-1000° C., and thus low-priced metals such as nickel and oxides such as lanthanum strontium manganite may be used as the catalysts. However, in such high temperature fuel cells, the difference between operating temperature and starting temperature is very high and thus the initialization of high temperature fuel cells is slow. Also, stress due to the difference in thermal deformation of each material is accumulated while a high temperature fuel cell is turned off and on so that durability of the fuel cell decreases. In addition, since conductive materials (such as, for example, an INCONEL alloy), which resist oxidation/reduction reaction at high temperature, may be used as an inter-connector, the cost of materials used in manufacturing of the high temperature fuel cell increases and productivity of the fuel cell decreases. In addition, since a glass-based material may be used as a sealing material, it is difficult to manufacture the high temperature fuel cell and the high temperature fuel cell has weak resistance to shocks.

When the operating temperature of a fuel cell is below 600° C., stainless steel may be used as an inter-connector. In addition, sealing may be more easily performed at a temperature of around 200° C. However, even if the thickness of an oxygen ion conductor used in a SOFC is reduced, resistance to ionic conduction is very high at a temperature of 300° C. or less and thus, it is difficult to use the oxygen ion conductor.

On the other hand, a proton conductor such as yttrium doped barium zirconate (BYZ: $Ba_{1-x}YxZrO_{3-\delta}$) has sufficient ionic conductivity at a temperature of 300° C. or less and thus may be useful as a proton conductor in a fuel cell operated at a temperature of less than 200° C. However, since carbonation may occur after $BaZrO_3$ reacts with $CO_2$ ($BaZrO_3 + CO_2 \rightarrow BaCO_3 + ZrO_2$) and since sintering of BYZ is difficult, forming a fuel cell using such a proton conductor may be difficult. However, according to the recent development of thin film processes, BYZ may be created without a sintering process through atomic layer deposition (ALD). In addition, since the ionic conductivity of BYZ is high at a low temperature, a fuel cell may be manufactured to operate at a temperature of around 80° C. by using BYZ, even when a thin film for an electrolyte having a thickness of 100 nm is manufactured. In this case, however, it is desirable to prevent carbonation resulting from the exposure of BZY to $CO_2$. More specifically, a large amount of $CO_2$, which is generally included in fuel, flows into a fuel cell through an anode and may carbonate BYZ used as an electrolyte. Moreover, several publications (K. D. Kreuer, Annu. Rev. Mater. Res. p. 348; Uda and Haile) disclose that $BaZrO_3$ reacts with $CO_2$ in the atmosphere (concentration: 330~380 ppm) at a temperature of 300° C. or less.

SUMMARY

One or more embodiments include a fuel cell including a chemical electrolyte protection layer and a method of manufacturing the fuel cell.

Additional aspects will be set forth in part in the description which follows and, in part, will be apparent from the description, or may be learned by practice.

To achieve the above and/or other aspects, one or more embodiments may include a solid-state fuel cell comprising: an anode; an anode side chemical electrolyte protection layer disposed on the anode; a hydrogen ion conductive solid oxide dense film disposed on the anode side chemical electrolyte protection layer; a cathode side chemical electrolyte protection layer disposed on the hydrogen ion conductive solid oxide dense film; and a cathode disposed on the cathode side chemical electrolyte protection layer.

To achieve the above and/or other aspects, one or more embodiments may include a method of manufacturing a solid-state fuel cell, the method including: forming an anode on a substrate; forming an anode side chemical electrolyte protection layer on the anode; forming a hydrogen ion conductive solid oxide dense film on the anode side chemical electrolyte protection layer; forming a cathode side chemical electrolyte protection layer on the hydrogen ion conductive solid oxide dense film; and forming a cathode on the cathode side chemical electrolyte protection layer.

Additional aspects and/or advantages will be set forth in part in the description which follows and, in part, will be obvious from the description, or may be learned by the practice thereof.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
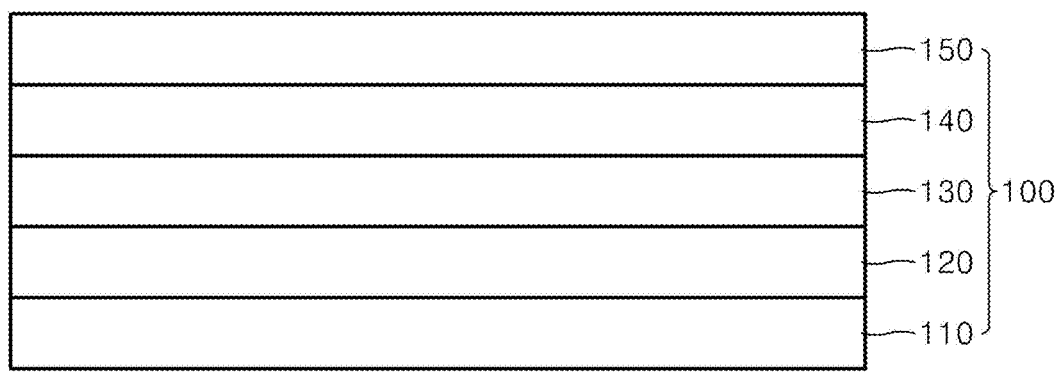
FIG. 1 is a cross-sectional view of a solid-state fuel cell according to an embodiment.

Reference will now be made in detail to the present embodiments, examples of which are illustrated in the accompanying drawings, wherein like reference numerals refer to the like elements throughout. The embodiments are described below in order to explain aspects thereof by referring to the figures.

FIG. 1 is a cross-sectional view of a solid-state fuel cell 100 according to an embodiment.

Referring to FIG. 1, the solid-state fuel cell 100 according to the present embodiment includes an anode 110, an anode side chemical electrolyte protection layer 120, a hydrogen ion conductive solid oxide dense film 130, a cathode side chemical electrolyte protection layer 140, and a cathode 150.

The anode 110 may include a porous mixed ionic electronic conductor layer (MIEC layer, hereinafter, referred to as a porous mixed conductor layer) (reference numeral 111 of FIG. 3). Herein, the term "porous" indicates a property whereby all gases, including hydrogen, may penetrate and the term "mixed conductor" refers to a property whereby $CO_2$ does not penetrate the layer and hydrogen ions, hydrogen atoms, or electricity may conduct through the layer. Since electricity may be conducted in the mixed conductor, the mixed conductor may replace a general current collector.

The porous mixed conductor layer 111 may include at least one selected from the group consisting of Pd, a Pd alloy, $RuO_2$, and $H_xWO_3$. Also, the anode 110 may include catalysts such as Pt, Pt—Ru, Pt, Pt—Co, Pt—Fe, Pt—Ni, Pt—Ti, and/or Pt—V.

The anode side chemical electrolyte protection layer 120 and the cathode side chemical electrolyte protection layer 140 are respectively disposed on the anode 110 and the cathode 150 and prevent gases such as $CO_2$ and SOx, which flow through the anode 110 and the cathode 150, from penetrating into the hydrogen ion conductive solid oxide film 130. The gases such as $CO_2$ and SOx may be included in fuel or generated in the anode 110 and the cathode 150. Accordingly, the anode side chemical electrolyte protection layer 120 and the cathode side chemical electrolyte protection layer 140 may prevent an electrolyte of the hydrogen ion conductive solid oxide film 130 from reacting with the gases existing in the anode 110 and the cathode 150 and deteriorating. In addition, the anode side chemical electrolyte protection layer 120 and the cathode side chemical electrolyte protection layer 140 may be or may include a non-porous MIEC layer (hereinafter, referred to as a non-porous mixed conductor layer) (reference numeral 120 or 140 of FIG. 2). Here, the term "non-porous" indicates that only hydrogen can penetrate the layer, whereas other gases such as $CO_2$ and SOx cannot penetrate the layer. In addition, the anode side chemical electrolyte protection layer 120 and the cathode side chemical electrolyte protection layer 140 may include at least one selected from the group consisting of Pd, a Pd alloy, $RuO_2$, and $H_xWO_3$ ($0 < x \leq 1$). Also, the anode side chemical electrolyte protection layer 120 and the cathode side chemical electrolyte protection layer 140 have electrical conductivity and may have a current collecting function.

The hydrogen ion conductive solid oxide dense film 130, which is interposed between the anode side chemical electrolyte protection layer 120 and the cathode side chemical electrolyte protection layer 140, is a layer through which protons are transmitted between the anode 110 and the cathode 150 and which prevents contact with oxygen and hydrogen. The hydrogen ion conductive solid oxide dense film 130 may include at least one oxide having a perovskite structure and selected from the group consisting of barium zirconate (BZ), barium cerate (BC), strontium zirconate (SZ), strontium cerate (SC), and solid solutions thereof, each of which may be doped with at least one of a divalent positive ion and a trivalent positive ion, but is not limited thereto. The hydrogen ion conductive solid oxide dense film 130 may include, for example, BYZ.

An interface between the anode side chemical electrolyte protection layer 120 and the hydrogen ion conductive solid oxide dense film 130 and/or an interface between the cathode side chemical electrolyte protection layer 140 and the hydrogen ion conductive solid oxide dense film 130 may have a rough and uneven microstructure. Herein, the term "rough and uneven microstructure" denotes that the interface(s) is not uniform and instead is rough on a microscale basis. As above, since the interface(s) has a rough and uneven microstructure, the size of a reaction area, in which the ionization reaction of hydrogen ($H \rightarrow H^+ + e^-$) occurs, increases and thus the ionization reaction rate may be increased. In addition, catalysts such as Pt may be further disposed at the interface between the anode side chemical electrolyte protection layer 120 and the hydrogen ion conductive solid oxide dense film 130 and/or at the interface between the cathode side chemical electrolyte protection layer 140 and the hydrogen ion conductive solid oxide dense film 130. When the catalysts are further added, the hydrogen ionization reaction rate may be increased. A process of forming the rough and uneven microstructure and the disposition of the catalysts will be described later.

Figure 3:
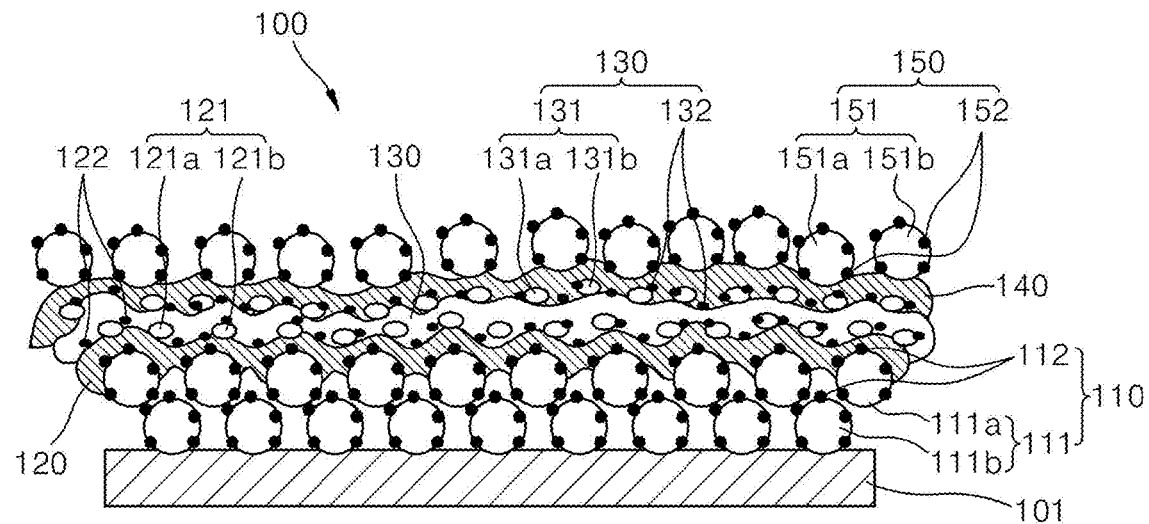
FIG. 3 is a cross-sectional view illustrating the solid-state fuel cell of FIG. 1 in more detail, according to an embodiment.

The cathode 150 may include a porous mixed conductor layer (reference numeral 151 of FIG. 3). The porous mixed conductor layer 151 may include at least one selected from the group consisting of Pd, a Pd alloy, $RuO_2$, and $HxWO_3$ (0<x≤1). In addition, the cathode 150 may include catalysts such as Pt, Pt—Co, Pt—Fe, Pt—Ni, Pt—Ti, Pt—V, and/or Pt—RU.

Figure 2:
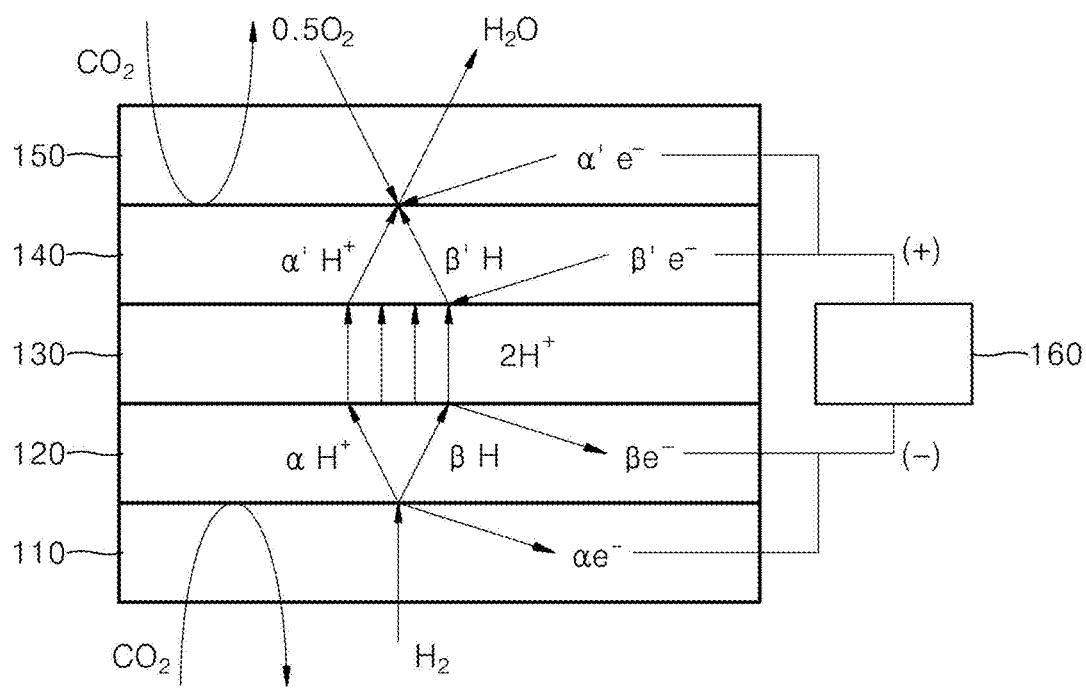
FIG. 2 is a cross-sectional view for explaining an operating principle of the solid-state fuel cell of FIG. 1.

FIG. 2 is a cross-sectional view for explaining an operating principle of the solid-state fuel cell 100 of FIG. 1.

Referring to FIG. 2, portions a of hydrogen molecules $H_2$ are ionized at the interface between the anode 110 and the anode side chemical electrolyte protection layer 120 and decomposed into $H^+$ protons and electrons $e^-$. The generated $H^+$ protons penetrate the anode side chemical electrolyte protection layer 120 and enter the hydrogen ion conductive solid oxide dense film 130. In addition, the hydrogen molecules $H_2$ that are not decomposed are additionally ionized at the interface between the anode side chemical electrolyte protection layer 120 and the hydrogen ion conductive solid oxide dense film 130 and decomposed into $H^+$ protons and electrons $e^-$. Since gases except for hydrogen do not penetrate the anode side chemical electrolyte protection layer 120, which is formed of Pd and/or a Pd alloy such as Pd—Au, $CO_2$ and SOx that are in fuel or that are generated in the anode 110 do not reach the hydrogen ion conductive solid oxide dense film 130. Electrons generated in the anode 110 and/or the anode side chemical electrolyte protection layer 120 operate a load 160 and enter the cathode 150 and/or the cathode side chemical electrolyte protection layer 140.

In addition, portions β' of $H^+$ protons, which pass through the hydrogen ion conductive solid oxide dense film 130 and reach the cathode side chemical electrolyte protection layer 140, combine with portions β' of the electrons $e^-$ at the interface between the hydrogen ion conductive solid oxide dense film 130 and the cathode chemical electrolyte protection layer 140 side so as to form hydrogen atoms. The remaining protons α', that are not combined with the electrons $e^-$, are combined with the remaining electrons α' at the interface between the cathode side chemical electrolyte protection layer 140 and the cathodes 150 so as to form hydrogen atoms. The generated hydrogen atoms combine with oxygen atoms so as to form water. $CO_2$ and SOx existing in the air are blocked by the cathode side chemical electrolyte protection layer 140 and do not reach the hydrogen ion conductive solid oxide dense film 130.

FIG. 3 is a cross-sectional diagram illustrating the solid-state fuel cell 100 in more detail, according to an embodiment. The solid-state fuel cell 100 according to the current embodiment includes the rough and uneven microstructures at the interface between the anode side chemical electrolyte protection layer 120 and the hydrogen ion conductive solid oxide dense film 130 and/or at the interface between the hydrogen ion conductive solid oxide dense film 130 and the cathode side chemical electrolyte protection layer 140. In the embodiment of FIG. 3, catalysts 122 and 132 are disposed at the interface(s).

Referring to FIG. 3, the solid-state fuel cell 100 according to the current embodiment includes a substrate 101, an anode 110, an anode side chemical electrolyte protection layer 120, a porous mixed conductor layer 121, a catalyst 122, a hydrogen ion conductive solid oxide dense film 130, a porous hydrogen ion conductive solid oxide layer 131, a catalyst 132, a cathode side chemical electrolyte protection layer 140, and a cathode 150.

The substrate 101 may be formed of a material including Si, as a non-limiting example, and may be porous.

The anode 110 includes the porous mixed conductor layer 111 and is disposed on the substrate 101. The porous mixed conductor layer 111 may include lumps or particles 111a and 111b of the mixed conductors such as Pd, that are formed in one or more layers whereby fuels such as hydrogen, methanol, ethanol, methane, butane, propane and other liquefied hydrocarbon gas may pass through the lumps 111a and 111b of the mixed conductors in gaseous state. Also, the catalyst 112, such as Pt, Pt—Co, Pt—Fe, Pt—Ni, Pt—Ti, Pt—V, and/or Pt—Ru may be interspersed on the surfaces of the lumps 111a and 111b of the mixed conductors or may be disposed on the surfaces of the lumps 111a and 111b of the mixed conductors in the form of a net. The surface of the anode 110 has a rough and uneven microstructure due to spaces formed between the lumps 111a and 111b of the mixed conductors.

The anode side chemical electrolyte protection layer 120, which is disposed on the anode 110, may be formed of or include a non-porous mixed conductor layer formed of a thin film of a mixed conductor such as Pd. Accordingly, only hydrogen may penetrate the anode side chemical electrolyte protection layer 120 and gases such as $CO_2$ and SOx may not penetrate the anode side chemical electrolyte protection layer 120. In addition, since the anode side chemical electrolyte protection layer 120 is disposed on the surface of the anode 110 having the rough and uneven microstructure, if a thickness of the anode side chemical electrolyte protection layer 120 is not too great, the rough and uneven microstructure of the surfaces of the anodes 110 is transferred to the anode side chemical electrolyte protection layer 120 and thus the surface of the anode side chemical electrolyte protection layer 120 may have a rough and uneven microstructure. As described above, the surface of the anode side chemical electrolyte protection layer 120 has a rough and uneven microstructure so that the area of the interface between the chemical electrolyte protection layer 120 and the hydrogen ion conductive solid oxide dense film 130 and rate of hydrogen ionization reaction at the interface may be increased.

The porous mixed conductor layer 121 is selectively disposed on the surface of the anode side chemical electrolyte protection layer 120 and increases the area of the interface between the anode side chemical electrolyte protection layer 120 and the hydrogen ion conductive solid oxide dense film 130. Accordingly, since the porous mixed conductor layer 121 is further included, the rate of the hydrogen ionization reaction at the interface is further increased. Small lumps 121a and 121b of the mixed conductors, which form the porous mixed conductor layer 121, are interspersed on the surfaces of the anode side chemical electrolyte protection layer 120. In addition, the catalyst 122 such as Pt may be selectively interspersed on the surfaces of the anode side chemical electrolyte protection layer 120 and/or the porous mixed conductor layer 121 or may be disposed on the surfaces of the anode side chemical electrolyte protection layer 120 and/or the porous mixed conductor layer 121 in the form of a net. As described above, when the catalyst 122 is further added, rate of hydrogen ionization reaction may be increased.

The hydrogen ion conductive solid oxide dense film 130 is disposed on the anode side chemical electrolyte protection layer 120 so as to cover the porous mixed conductor layer 121 and the catalyst 122. Since the hydrogen ion conductive solid oxide dense film 130 is disposed on the surface of the anode side chemical electrolyte protection layer 120 having the rough and uneven microstructure, the rough and uneven microstructure of the surface of the anode side chemical electrolyte protection layer 120 is transferred to some portion of or to the entire surface of the hydrogen ion conductive solid oxide dense film 130 and thus, the surface of the hydrogen ion conductive solid oxide dense film 130 has the rough and uneven microstructure. Since the surface of the hydrogen ion conductive solid oxide dense film 130 has a rough and uneven microstructure, as described above, the area of the interface between the hydrogen ion conductive solid oxide dense film 130 and the cathode side chemical electrolyte protection layer 140 increases and thus, the rate of the proton reduction reaction at the interface may be increased. If the surface roughness of the rough and uneven microstructure of the surface of the anode side chemical electrolyte protection layer 120 is significantly small compared to the thickness of the hydrogen ion conductive solid oxide dense film 130, the uneven structure may be transferred only to one surface of the hydrogen ion conductive solid oxide dense film 130 contacting the anode side chemical electrolyte protection layer 120 and may not be transferred to the other surface of the hydrogen ion conductive solid oxide dense film 130. Accordingly, in this case, a separate rough and uneven microstructure should be formed on the other surface of the hydrogen ion conductive solid oxide dense film 130, as will be described later.

The porous hydrogen ion conductive solid oxide layer 131 is selectively disposed on the surface of the hydrogen ion conductive solid oxide dense film 130 and increases the area of the interface between the hydrogen ion conductive solid oxide dense film 130 and the cathode side chemical electrolyte protection layer 140. Accordingly, when the porous hydrogen ion conductive solid oxide layer 131 is further included, the rate of the proton reduction reaction at the interface is further increased. Small lumps 131a and 131b of the hydrogen ion conductive solid oxides, which form the porous hydrogen ion conductive solid oxide layer 131, are interspersed on the surfaces of the hydrogen ion conductive solid oxide dense film 130. In addition, the catalyst 132 such as Pt may be selectively interspersed on the surfaces of the hydrogen ion conductive solid oxide dense film 130 and/or the porous hydrogen ion conductive solid oxide layer 131 or may be disposed on the surfaces of the hydrogen ion conductive solid oxide dense film 130 and/or the porous hydrogen ion conductive solid oxide layer 131 in the form of a net. As described above, when the catalyst 132 is further added, the rate of the proton reduction reaction may be increased.

The cathode side chemical electrolyte protection layer 140 is disposed on the hydrogen ion conductive solid oxide dense film 130 so as to cover the porous hydrogen ion conductive solid oxide layer 131 and the catalysts 132. In addition, since the cathode side chemical electrolyte protection layer 140 is disposed on the surface of the hydrogen ion conductive solid oxide dense film 130 having the rough and uneven microstructure, the rough and uneven microstructure of the surface of the hydrogen ion conductive solid oxide dense film 130 is transferred to some portion of or to the entire surface of the cathode side chemical electrolyte protection layer 140 and thus, the surface of the cathode side chemical electrolyte protection layer 140 has a rough and uneven microstructure.

The cathode 150 includes the porous mixed conductor layer 151 and is disposed on the cathode side chemical electrolyte protection layer 140. The porous mixed conductor layer 151 has lumps 151a and 151b of the mixed conductors such as Pd, that are formed in one or more layers, and gases such as hydrogen may pass between the lumps 151a and 151b of the mixed conductors. Also, catalysts 152 such as Pt, Pt—Co, Pt—Fe, Pt—Ni, Pt—Ti, Pt—V, and/or Pt—Ru may be interspersed on the surfaces of the lumps 151a and 151b of the mixed conductors or may be disposed on the surfaces of the lumps 151a and 151b of the mixed conductors in the form of a net.

The solid-state fuel cell 100 as described above includes a pair of chemical electrolyte protection layers 120 and 140 respectively on both surfaces of the hydrogen ion conductive solid oxide dense film 130 so that gases such as $CO_2$ and $SO_x$ are prevented from reaching the hydrogen ion conductive solid oxide dense film 130. Thus, the hydrogen ion conductive solid oxide dense film 130 may be prevented from chemically reacting with the gases and deteriorating. Accordingly, even if electrolytes that may be operated at a low temperature, such as hydrogen ion conductive solid oxides including BYZ, are used, the durability of the electrolytes may be improved. In addition, since the interfaces between the hydrogen ion conductive solid oxide dense film 130 and each of the chemical electrolyte protection layers 120 and 140 have a relatively large area, electrochemical reaction and conduction of protons may rapidly occur. Also, since catalysts may be further included at the interfaces, the electrochemical reaction may be facilitated. The solid-state fuel cell 100 may use at least one selected from the group consisting of hydrogen, methane, natural gas, methanol, ethanol and liquefied hydrocarbon gas as a fuel. Also, the solid-state fuel cell 100 may operate over a temperature range of room temperature to 700° C. Over 700° C., the hydrogen ion conductive solid oxide dense film 130 may lose hydrogen ion conductivity.

Hereinafter, a method of manufacturing the solid-state fuel cell 100, according to an embodiment is described in more detail.

FIGS. 4A through 4H are cross-sectional views sequentially illustrating a method of manufacturing the solid-state fuel cell 100, according to an embodiment. In the drawings, like reference numerals denote like elements.

Figure 4A:
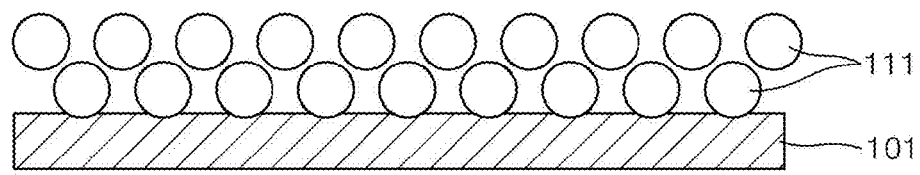
FIGS. 4A through 4H are cross-sectional views illustrating a method of manufacturing a fuel cell, according to embodiments.

Referring to FIG. 4A, the porous mixed conductor layer 111 may be formed on the substrate 101 by a variety of film deposition methods. Examples of the deposition methods include sputtering, chemical vapor deposition (CVD), atom layer deposition (ALD), or pulsed laser deposition (PLD). The substrate 101 may have a porous structure.

Figure 4B:
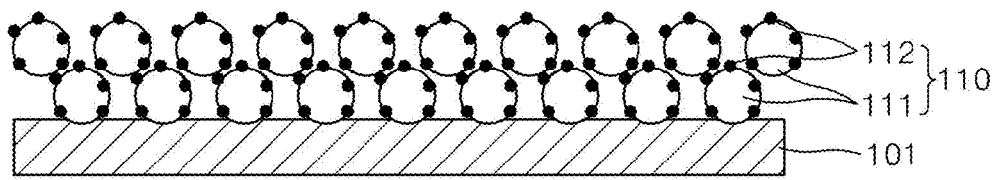

Referring to FIG. 4B, the catalyst 112, formed of a material such as Pt, may be formed on the porous mixed conductor layer 111 by a variety of film deposition methods so as to form the anode 110. Examples of the deposition methods include CVD or ALD. Deposition conditions such as deposition temperature and exposure time of precursors of the catalyst 112 and the number of depositions may be controlled so that the catalyst 112 does not completely cover the porous mixed conductor layer 111.

Figure 4C:
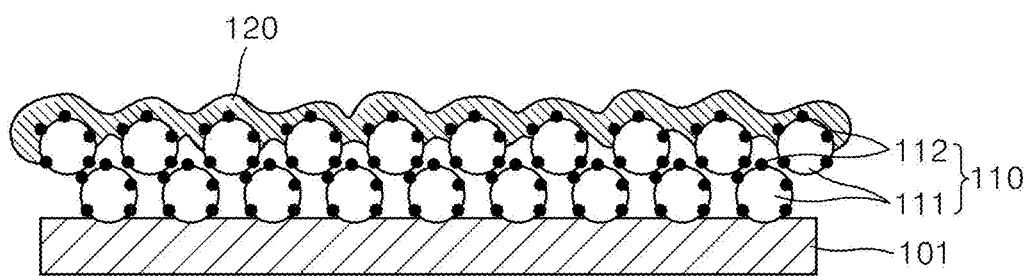

Referring to FIG. 4C, the anode side chemical electrolyte protection layer 120, which is formed of a non-porous mixed conductor or includes a non-porous mixed conductor layer, may be formed on the anode 110 by a variety of film deposition methods. Examples of the deposition methods include sputtering, ALD, CVD, or PLD. When sputtering or PLD is used, the pressure in the chamber where sputtering occurs may be reduced so as to form a dense layer. When ALD or CVD is used, the spaces formed in the anode 110 on which the anode side chemical electrolyte protection layer 120 is formed, may not be completely filled due to a long exposure time of precursors of the anode side chemical electrolyte protection layer 120. The upper surface of the anode side chemical electrolyte protection layer 120 has a slightly rough and uneven microstructure. The microstructure provides a considerably large surface area and may include pores connected to the surface. The microstructure may be formed by varying the conditions of sputtering, ALD, CVD, or PLD used to form the porous mixed conductor layer 111 and the chemical electrolyte protection layer 120.

Figure 4D:
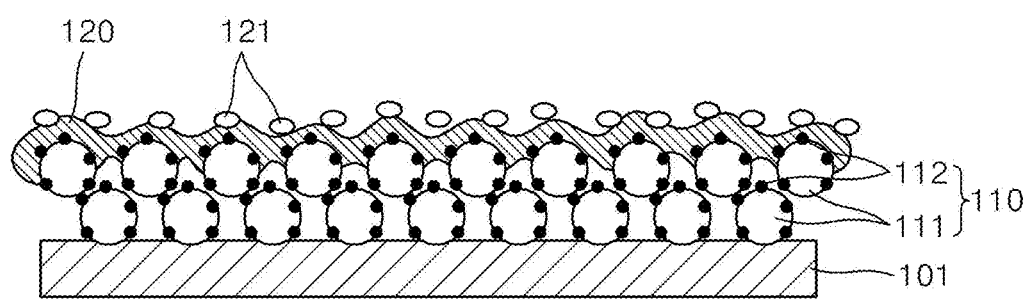

Referring to FIG. 4D, the porous mixed conductor layer 121 is formed on the upper surface of the anode side chemical electrolyte protection layer 120.

Figure 4E:
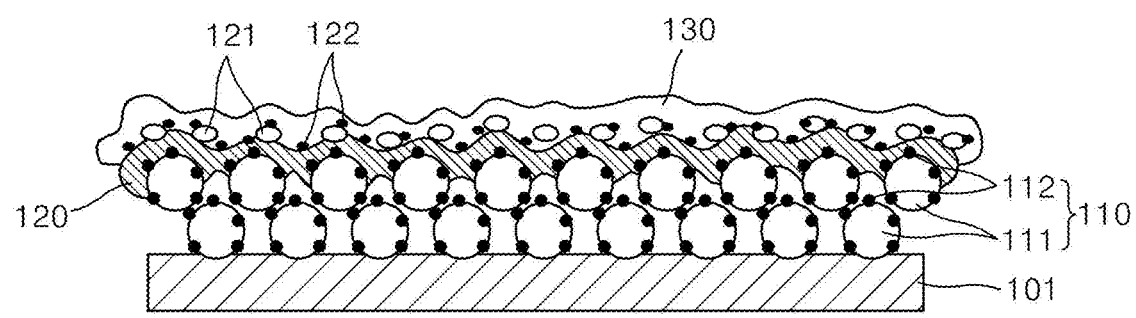

Referring to FIG. 4E, the catalyst 122 is dispersed on the anode side chemical electrolyte protection layer 120 and the porous mixed conductor layer 121 by ALD. Then, the hydrogen ion conductive solid oxide dense film 130 is formed on the anode side chemical electrolyte protection layer 120 so as to fully cover the porous mixed conductor layer 121 and the catalyst 122 by using a conformal method such as ALD. The rough and uneven microstructure formed on the upper surface of the anode side chemical electrolyte protection layer 120 is transferred to the hydrogen ion conductive solid oxide dense film 130, and the interface between the anode side chemical electrolyte protection layer 120 and the hydrogen ion conductive solid oxide dense film 130 has a considerably large area.

Figure 4F:
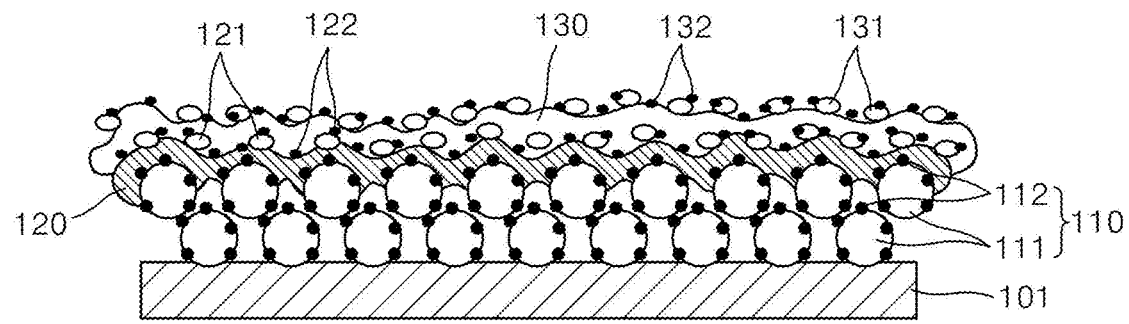

Referring to FIG. 4F, if the rough and uneven microstructure formed on the lower surface of the hydrogen ion conductive solid oxide dense film 130 (that is, the surface facing the anode 110) is not sufficiently transferred to the upper surface of the hydrogen ion conductive solid oxide dense film 130 (that is, the surface facing the cathode 150 to be formed), the porous hydrogen ion conductive solid oxide layer 131 is additionally formed on the upper surface of the hydrogen ion conductive solid oxide dense film 130 by sputtering, spray pyrolysis or CVD so as to increase the roughness of the rough and uneven microstructure. Then, the catalyst 132 is dispersed on the upper surfaces of the hydrogen ion conductive solid oxide dense film 130 and the porous hydrogen ion conductive solid oxide layer 131 by ALD.

Figure 4G:
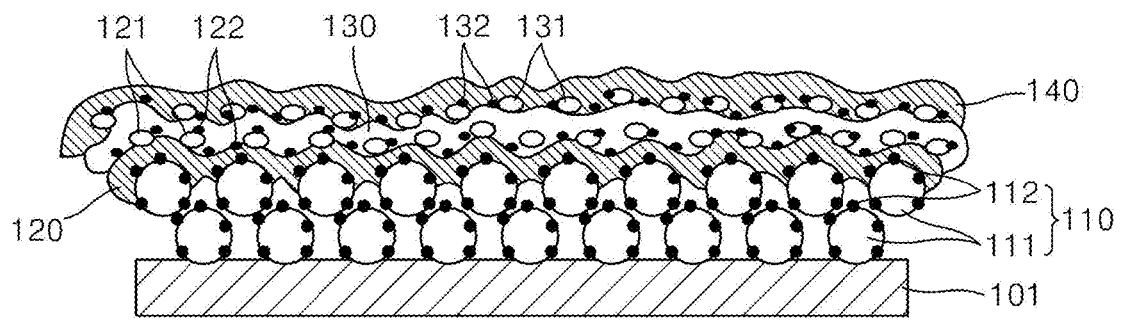

Referring to FIG. 4G, the cathode side chemical electrolyte protection layer 140, which is formed of a non-porous mixed conductor or includes a non-porous mixed conductor layer, is formed on the hydrogen ion conductive solid oxide dense film 130 by using a conformal method such as ALD, or CVD so as to cover the porous hydrogen ion conductive solid oxide layer 131 and the catalysts 132.

Figure 4H:
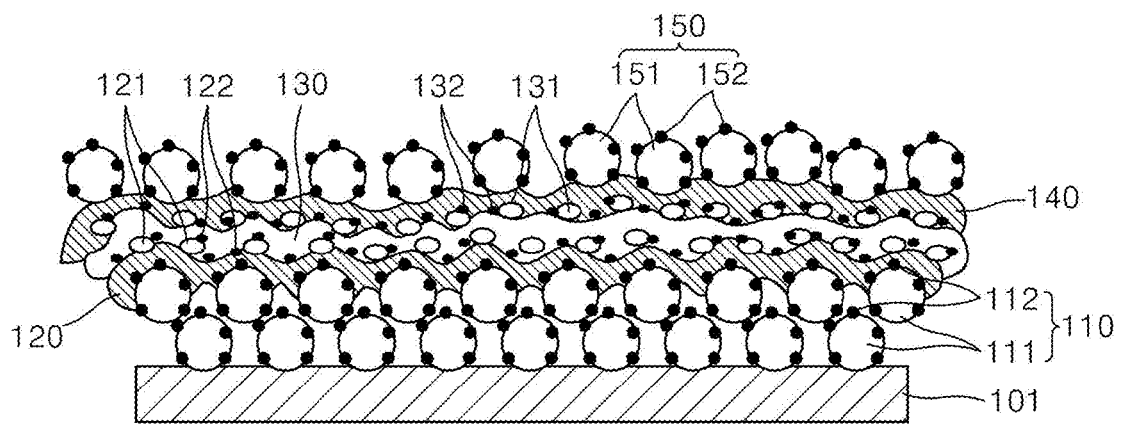

Referring to FIG. 4H, the cathode 150 is formed on the upper surface of the cathode side chemical electrolyte protection layer 140 in the same manner as the anode 110 is formed in FIGS. 4A and 4B so as to complete the manufacture of the solid-state fuel cell 100. The cathode 150 includes the porous mixed conductor layer 151 and the catalyst 152 dispersed on the porous mixed conductor layer 151. The substrate 101 may be removed from anode 110 in the fabrication of the solid-state fuel cell 100 after the cathode 150 is formed.

Hereinafter, interfaces between the hydrogen ion conductive solid oxide dense film 130 and each of the chemical electrolyte protection layers 120 and 140 in the solid-state fuel cell 100 are described in more detail. More specifically, the functions and importance of the interfaces, and a method for forming the rough and uneven microstructure for increasing the area of the interfaces are described more fully.

In the interfaces between each of the chemical electrolyte protection layers 120 and 140 and the hydrogen ion conductive solid oxide dense film 130, (1) conduction of protons (anode side chemical electrolyte protection layer 120→hydrogen ion conductive solid oxide dense film 130→cathode side chemical electrolyte protection layer 140) and (2) electrochemical reaction (anode side: $H \rightarrow H^+ + e^-$, cathode side: $H^+ + e^- \rightarrow H$) are performed. Thus, it is desirable to increase the areas of the interfaces and to dispose catalysts at each interface.

To the area of the interfaces between each of the chemical electrolyte protection layers 120 and 140 and the hydrogen ion conductive solid oxide dense film 130 in the solid-state fuel cell 100, rough and uneven microstructures are formed on the surfaces of the hydrogen ion conductive solid oxide dense film 130 as described above. As non-limiting examples, two different methods for forming the rough and uneven microstructures may be used.

Figure 5A:
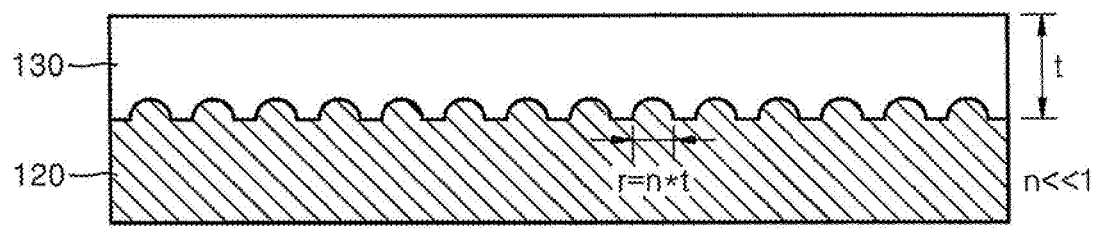
FIGS. 5A and 5B are cross sectional views illustrating a method for forming an uneven structure of a hydrogen ion conductive solid oxide film when the thickness of the uneven structure formed on an anode side chemical electrolyte protection layer is much less than the thickness of the hydrogen ion conductive solid oxide film.
Figure 5B:
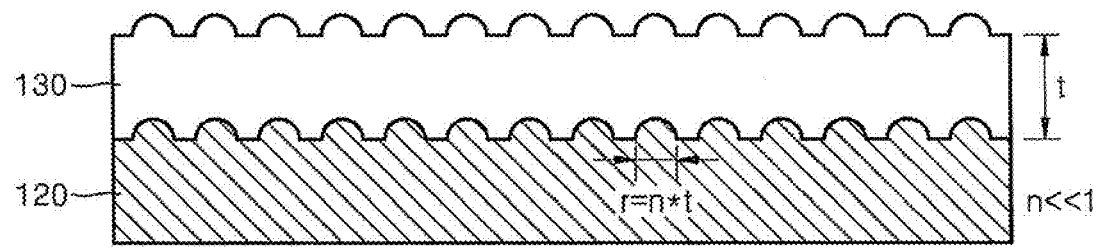

FIGS. 5A and 5B are cross sectional views illustrating a method for forming the rough and uneven microstructure of the hydrogen ion conductive solid oxide dense film 130 when the size of the rough and uneven microstructures formed on the chemical electrolyte protection layer 120 on the anode side is very small compared to the thickness of the hydrogen ion conductive solid oxide dense film 130.

When the Size R of the Rough and Uneven Microstructure is Significantly Less than the Thickness T of the Hydrogen Ion Conductive Solid Oxide Dense Film 130

Referring to FIG. 5A, the rough and uneven microstructure that is previously formed on the anode side chemical electrolyte protection layer 120 is naturally transferred to the hydrogen ion conductive solid oxide dense film 130 during the forming of the hydrogen ion conductive solid oxide dense film 130 to form the rough and uneven microstructure on the lower surface of the hydrogen ion conductive solid oxide dense film 130. Here, n denotes the ratio of the size r of the rough and uneven microstructure and the thickness t of the hydrogen ion conductive solid oxide dense film 130, that is, r/t. The proviso that n<<1 indicates that the size r of the rough and uneven microstructure is much smaller than the thickness t of the hydrogen ion conductive solid oxide dense film. As seen in FIG. 5A, the rough and uneven microstructure of the anode side chemical electrolyte protection layer 120 is not directly transferred to the opposite side of the hydrogen ion conductive solid oxide dense film 130. Accordingly, referring to FIG. 5B, an additional process for forming the rough and uneven microstructure is further added in forming of the hydrogen ion conductive solid oxide dense film 130 to form the rough and uneven microstructure on the upper surface of the hydrogen ion conductive solid oxide dense film 130.

Figure 6:
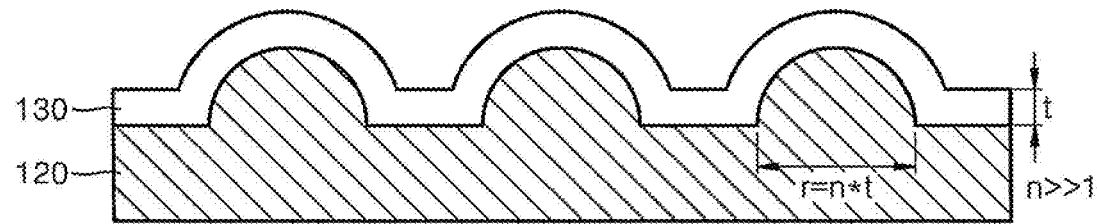
FIG. 6 is a cross-sectional view illustrating a method for forming an uneven structure of a hydrogen ion conductive solid oxide film when the thickness of the uneven structure formed on an anode side chemical electrolyte protection layer is much greater than the thickness of the hydrogen ion conductive solid oxide film.

FIG. 6 is a cross-sectional view illustrating a method for forming the rough and uneven microstructure of the hydrogen ion conductive solid oxide dense film 130 when the size of the rough and uneven microstructure formed on the anode side chemical electrolyte protection layer 120 is great compared to the thickness of the hydrogen ion conductive solid oxide dense film 130.

When the Size R of the Rough and Uneven Microstructure is Significantly Greater than the Thickness T of the Hydrogen Ion Conductive Solid Oxide Dense Film 130

Referring to FIG. 6, the rough and uneven microstructure that is previously formed on the anode side chemical electrolyte protection layer 120 is naturally transferred to the hydrogen ion conductive solid oxide dense film 130 during the forming of the hydrogen ion conductive solid oxide dense film 130 to form the rough and uneven microstructure on the lower surface of the hydrogen ion conductive solid oxide dense film 130. The proviso that n>>1 indicates that the size r of the rough and uneven microstructure is much greater than the thickness t of the hydrogen ion conductive solid oxide dense film. In this case, the rough and uneven microstructure on the lower surface of the hydrogen ion conductive solid oxide dense film 130 is directly transferred to the upper surface of the hydrogen ion conductive solid oxide dense film 130 to form the rough and uneven microstructure on the upper surface of the hydrogen ion conductive solid oxide dense film 130.

The embodiments will be described in greater detail with reference to the following examples. The following examples are for illustrative purposes only and are not intended to limit the scope of the embodiments.

Example 1

Figure 7:
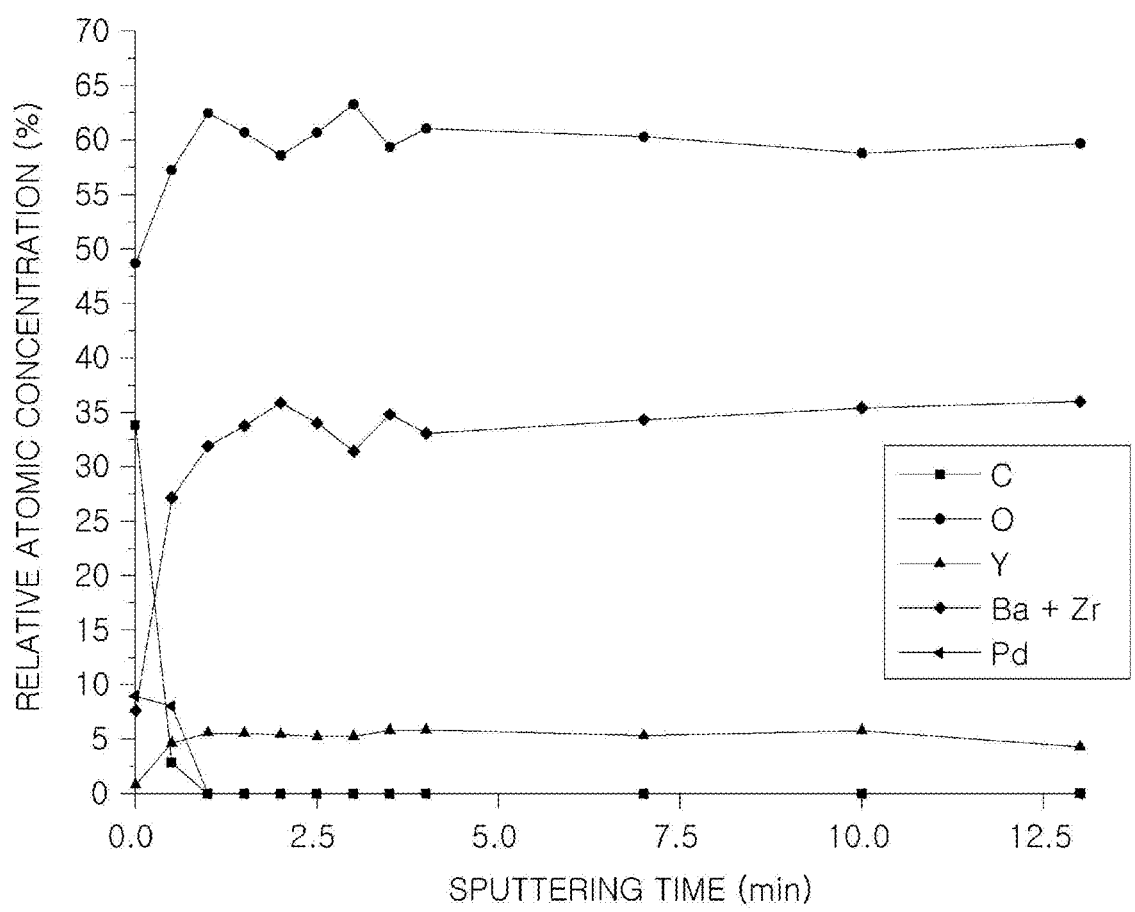
FIG. 7 is a graph showing an x-ray photoelectron spectroscopy (XPS) analysis result of each stage obtained while sputtering a laminate after exposing it to air for twenty days, wherein the laminate consists of a BYZ thin film and a Pd layer as a chemical electrolyte protection layer that are sequentially deposited.

A BYZ thin film having a thickness of 130 nm was formed on the surface of an SiN substrate having a thickness of 100 nm using PLD under the conditions of not being exposed to air. Then, a Pd layer (corresponding to a chemical electrolyte protection layer) having a thickness of 10 nm was formed on the BYZ thin film under the conditions of not being exposed to air. The PLD was performed after creating a vacuum inside a PLD chamber and then adjusting the oxygen partial pressure to 100 mTorr. Next, the SiN substrate-BYZ thin film-Pd layer laminate was exposed to air for twenty days and then sputtering (using $Ar^+$, intensity of sputtering: 1,000 KeV) of the laminate was performed. XPS analysis was conducted at each stage of the sputtering. The concentration of each element according to the sputtering time (in proportion to a thickness of the laminate) obtained as a result of the XPS analysis is shown in FIG. 7. The sputtering and the XPS analysis were sequentially performed from the Pd layer to the BYZ thin film.

Referring to FIG. 7, in a thickness of the laminate where the Pd content was 0, the content of C was 0. This result shows that the Pd layer prevents the penetration into the laminate of $CO_2$ included in the air.

Figure 8:
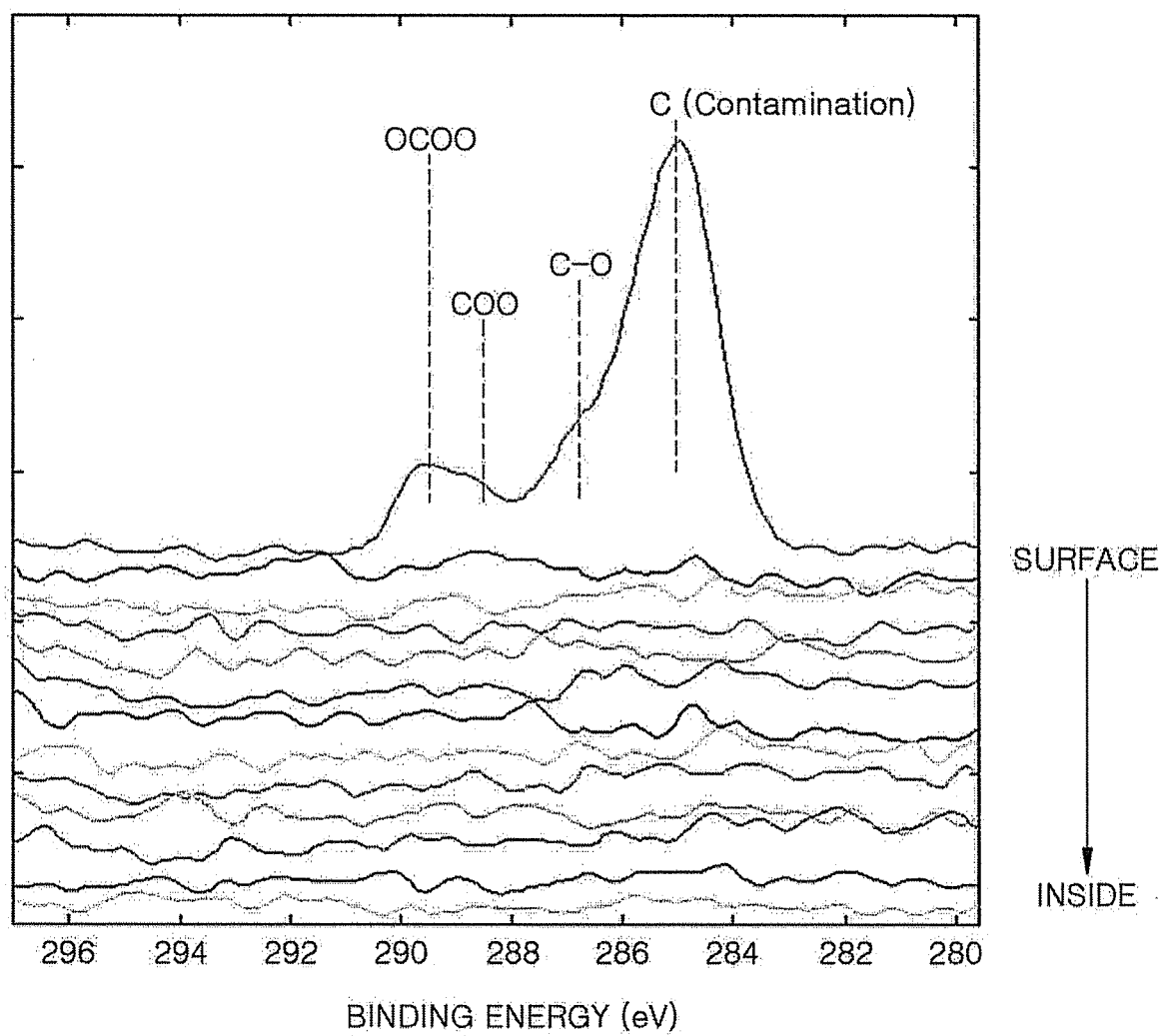
FIG. 8 is a graph showing a high resolution XPS result obtained by analyzing a form of carbon existing in the laminate of FIG. 7.

In addition, in order to identify the form of carbon that appears in FIG. 7, high resolution XPS for a 1 s electron orbit of carbon (C1s) was performed on a region of a binding energy of 293~278 eV and the result is shown in FIG. 8. It is known that a C1s peak moves from 285 eV to 290 eV when carbon exists in the form of $CO_3^{2-}$.

Referring to FIG. 8, it can be seen that carbon existing in the surface of the Pd layer is not in the form of $CO_3^{2-}$.

Comparative Example 1

Figure 9:
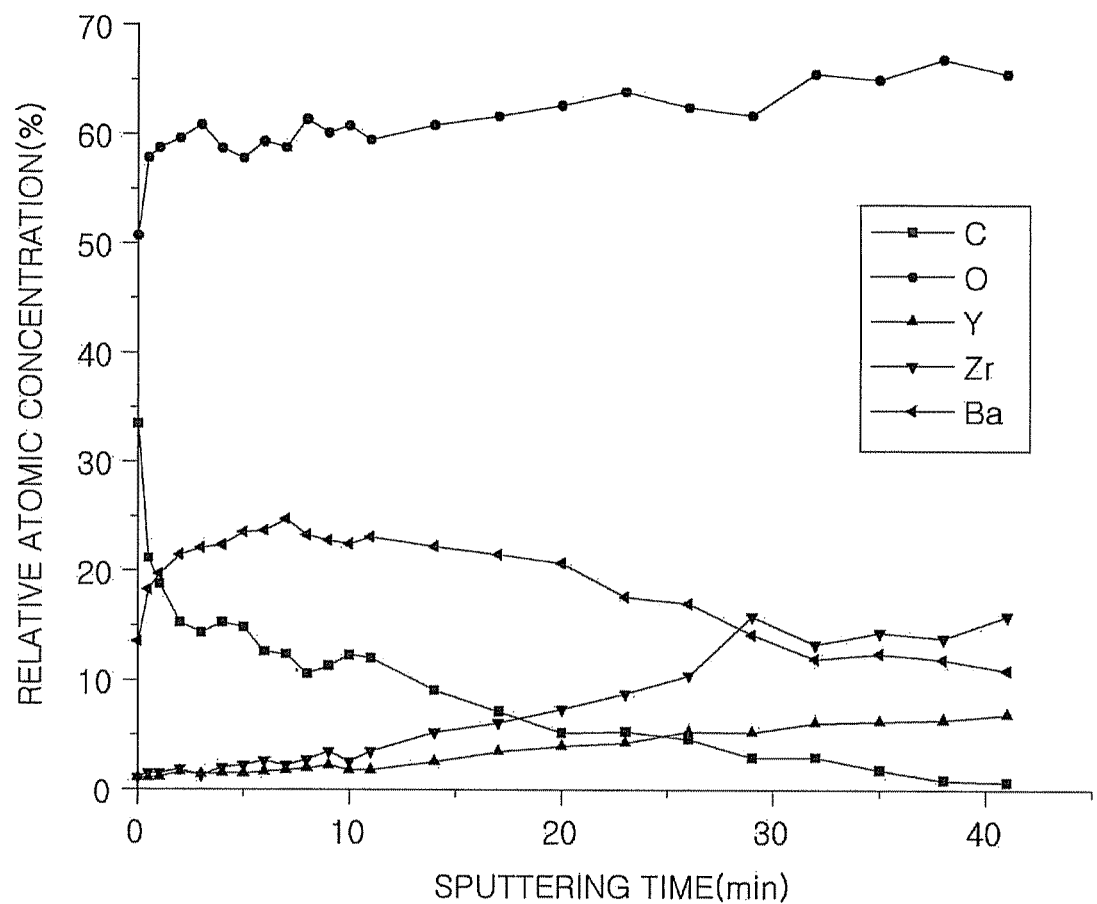
FIG. 9 is a graph showing a XPS analysis result of each stage obtained while sputtering a laminate after exposing it to air for twenty three days, wherein the laminate consists of only a BYZ thin film without a chemical electrolyte protection layer.

A BYZ thin film was formed on a SiN substrate in the same manner as in Example 1. However, in this case, a Pd layer was not formed on the BYZ thin film. Then, the SiN substrate-BYZ thin film laminate was exposed to air for twenty three days and then sputtering of the laminate was performed in the same manner as in Example 1. Then, XPS analysis was performed to analyze the concentration of each element according to the sputtering time, and the result is shown in FIG. 9. The sputtering and the XPS analysis were performed for the BYZ thin film.

Referring to FIG. 9, carbon may be found deep inside the BYZ thin film, and it is believed that the carbon is present because $CO_2$ in the air penetrates and infiltrates the BYZ thin film.

Figure 10:
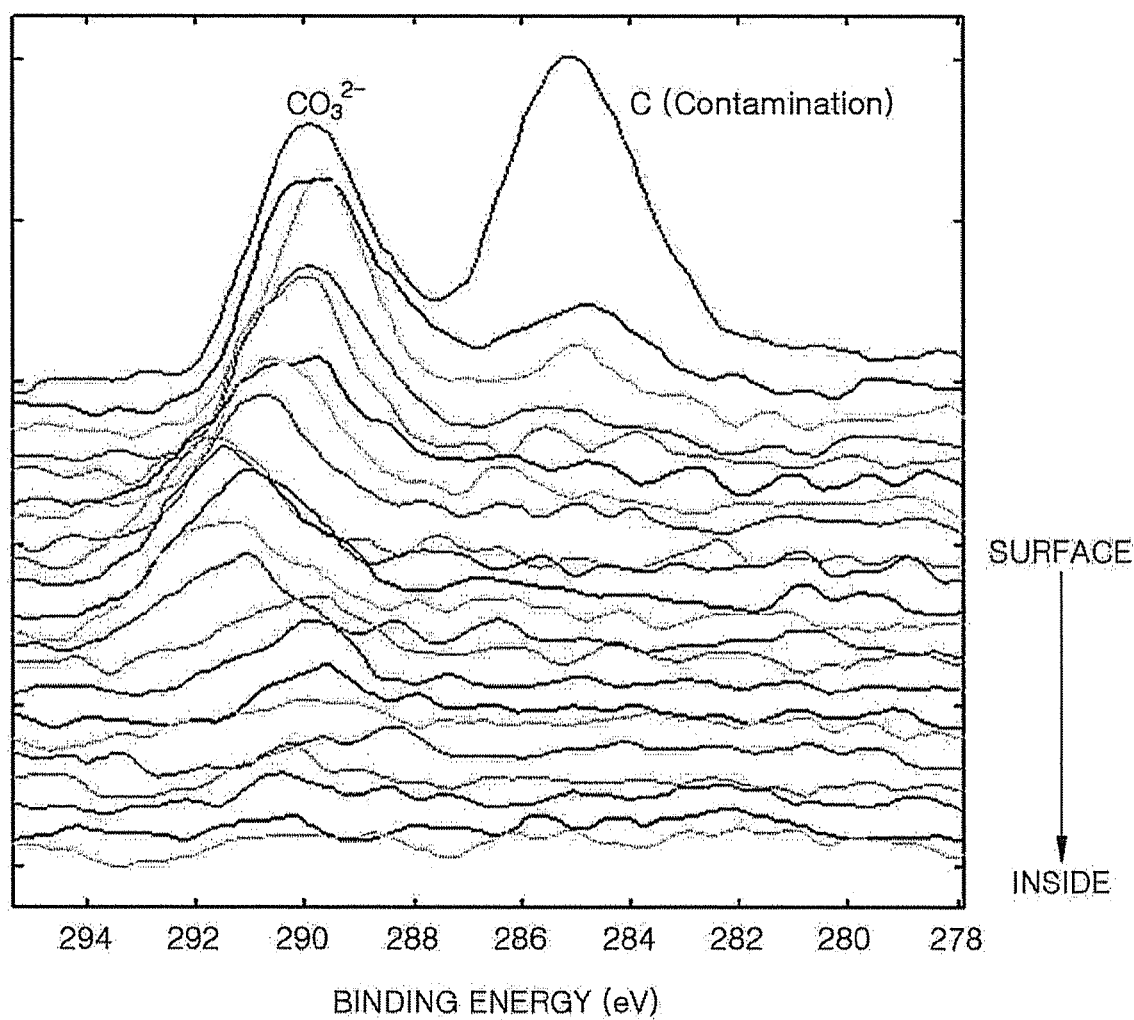
FIG. 10 is a graph showing a high resolution XPS result obtained by analyzing a form of carbon existing in the laminate of FIG. 9.

In order to identify whether carbon exists as $BaCO_3$ or another form, high resolution XPS was performed in the same manner as in Example 1 and the result is shown in FIG. 10.

Referring to FIG. 10, two peaks corresponding to C and $CO_3^{2-}$ are indicated on the surface of the BYZ thin film. In other words, carbon found on the surface of the BYZ thin film consists of carbon absorbed from the air (C peak) and carbon existing in the form of $CO_3^{2-}$ ions, which originated from the reaction of $CO_2$ in the air and other elements. It can also be seen that the peak corresponding to C of FIG. 10 rapidly decreases towards the inside of the BYZ thin film, whereas the peak corresponding to $CO_3^{2-}$ appears deep inside the BYZ thin film. Accordingly, the carbon detected is in the form of $CO_3^{2-}$, except on the surface of the BYZ thin film. Therefore, it can be concluded that a $BaO+CO_2 \rightarrow BaCO_3$ reaction occurs in the BYZ thin film.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A solid-state fuel cell comprising:
   an anode;
   an anode side chemical electrolyte protection layer disposed on the anode;
   a hydrogen ion conductive solid oxide dense film disposed on the anode side chemical electrolyte protection layer;
   a cathode side chemical electrolyte protection layer disposed on the hydrogen ion conductive solid oxide dense film; and
   a cathode disposed on the cathode side chemical electrolyte protection layer, wherein:
   the anode side chemical electrolyte protection layer and the cathode side chemical electrolyte protection layer prevent penetration of $CO_2$ and SOx into the hydrogen ion conductive solid oxide dense film, and
   the interface between the anode side chemical electrolyte protection layer and the hydrogen ion conductive solid oxide dense film and the interface between the hydrogen ion conductive solid oxide dense film and the cathode side chemical electrolyte protection layer have rough and uneven microstructures, respectively.

2. The solid-state fuel cell of claim 1, wherein at least one of the anode and the cathode comprises a porous mixed ionic electronic conductor (MIEC) layer.

3. The solid-state fuel cell of claim 2 wherein the porous MIEC layer comprises at least one selected from the group consisting of Pd, a Pd alloy, $RuO_2$, and $HxWO_3$ (0<x≤1).

4. The solid-state fuel cell of claim 1, wherein the hydrogen ion conductive solid oxide dense film comprises at least one oxide having a perovskite structure and selected from the group consisting of barium zirconate (BZ), barium cerate (BC), strontium zirconate (SZ), strontium cerate (SC), and solid solutions thereof.

5. The solid-state fuel cell of claim 1, wherein the hydrogen ion conductive solid oxide dense film comprises at least oxide having a perovskite structure and selected from the group consisting of barium zirconate (BZ), barium cerate (BC), strontium zirconate (SZ), strontium cerate (SC), solid solutions thereof, each of which is optionally doped with at least one of a divalent positive ion and a trivalent positive ion.

6. The solid-state fuel cell of claim 1, wherein the anode side chemical electrolyte protection layer and the cathode side chemical electrolyte protection layer each comprise a non-porous mixed ionic electronic conductor (MIEC) layer.

7. The solid-state fuel cell of claim 6, wherein each non-porous MIEC layer comprises at least one selected from the group consisting of Pd, a Pd alloy, $RuO_2$, and $HxWO_3$ (0<x≤1).

8. The solid-state fuel cell of claim 1, wherein the rough and uneven microstructure of the interface between the anode side chemical electrolyte protection layer and the hydrogen ion conductive solid oxide dense film is formed by transferring a rough and uneven microstructure formed on the surface of the anode side chemical electrolyte protection layer to the surface of the hydrogen ion conductive solid oxide dense film, and wherein the rough and uneven microstructure of the interface between the hydrogen ion conductive solid oxide dense film and the cathode side chemical electrolyte protection layer is formed by transferring a rough and uneven microstructure of the surface of the hydrogen ion conductive solid oxide dense film to the surface of the cathode side chemical electrolyte protection layer.

9. The solid-state fuel cell of claim 1, further comprising a catalyst disposed on at least one of the interfaces between the anode side chemical electrolyte protection layer and the hydrogen ion conductive solid oxide dense film, and between the hydrogen ion conductive solid oxide dense film and the cathode side chemical electrolyte protection layer.

10. The solid-state fuel cell of claim 9 wherein the catalyst is interspersed on the interface or disposed on the interface in the form of a net.

11. The solid-state fuel cell of claim 9, wherein the catalyst comprises at least one selected from the group consisting of Pt, Pt—Ru, Pt—Co, Pt—Fe, Pt—Ni, Pt—Ti, and Pt—V.

12. The solid-state fuel cell of claim 1, further comprising a porous mixed ionic electronic conductor (MIEC) layer disposed between the anode side chemical electrolyte protection layer and the hydrogen ion conductive solid oxide dense film.

13. The solid-state fuel cell of claim 1, further comprising a porous hydrogen ion conductive solid oxide layer disposed between the hydrogen ion conductive solid oxide dense film and the cathode side chemical electrolyte protection layer.

14. The solid-state fuel cell of claim 1, further comprising a catalyst disposed on at least one of the anode and the cathode.

15. The solid-state fuel cell of claim 14, wherein the catalyst is interspersed on the interface or on at least one of the anodes and the cathodes, or disposed on the interface or on at least one of the anodes and the cathodes in the form of a net.

16. The solid-state fuel cell of claim 14, wherein the catalyst comprises at least one selected from the group consisting of Pt, Pt—Ru, Pt—Co, Pt—Fe, Pt—Ni, Pt—Ti, and Pt—V.

17. The solid-state fuel cell of claim 1, wherein the fuel cell operates using at least one selected from the group consisting of hydrogen, methane, natural gas, methanol, ethanol and liquefied hydrocarbon gas as a fuel.

18. The solid-state fuel cell of claim 1, wherein the fuel cell operates over a temperature range from about a room temperature to about 700° C.

* * * * *